(12) United States Patent
Zhang et al.

(10) Patent No.: US 7,630,976 B2
(45) Date of Patent: Dec. 8, 2009

(54) METHOD AND SYSTEM FOR ADAPTING SEARCH RESULTS TO PERSONAL INFORMATION NEEDS

(75) Inventors: Benyu Zhang, Beijing (CN); Gui-Rong Xue, Shanghai (CN); Hua-Jun Zeng, Beijing (CN); Wei-Ying Ma, Beijing (CN); Xue-Mei Jiang, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 11/125,839

(22) Filed: May 10, 2005

(65) Prior Publication Data
US 2006/0259480 A1    Nov. 16, 2006

(51) Int. Cl.
G06F 17/30    (2006.01)
G06Q 30/00    (2006.01)

(52) U.S. Cl. ............................................ 707/5; 705/14
(58) Field of Classification Search .................... 707/1, 707/3
See application file for complete search history.

(56) References Cited

U.S. PATENT DOCUMENTS

| | | | | |
|---|---|---|---|---|
| 6,026,388 | A * | 2/2000 | Liddy et al. .................... | 707/1 |
| 6,185,558 | B1 | 2/2001 | Bowman et al. | |
| 6,418,431 | B1 * | 7/2002 | Mahajan et al. ................. | 707/4 |
| 6,460,036 | B1 * | 10/2002 | Herz ........................... | 707/10 |
| 6,654,725 | B1 * | 11/2003 | Langheinrich et al. ........ | 705/14 |
| 6,754,626 | B2 * | 6/2004 | Epstein ........................ | 704/235 |
| 6,766,316 | B2 * | 7/2004 | Caudill et al. ................. | 707/3 |
| 6,993,586 | B2 * | 1/2006 | Chen et al. ................... | 709/228 |
| 7,035,812 | B2 * | 4/2006 | Meisel et al. ................. | 705/14 |
| 7,346,615 | B2 * | 3/2008 | Bem ............................. | 707/5 |
| 7,454,417 | B2 * | 11/2008 | Tong et al. .................... | 707/5 |
| 2001/0014868 | A1 * | 8/2001 | Herz et al. .................... | 705/14 |
| 2003/0149938 | A1 * | 8/2003 | McElfresh et al. .......... | 715/517 |
| 2003/0212760 | A1 * | 11/2003 | Chen et al. .................. | 709/218 |
| 2003/0220918 | A1 * | 11/2003 | Roy et al. ...................... | 707/3 |
| 2004/0220914 | A1 * | 11/2004 | Cheung et al. ................ | 707/3 |
| 2005/0060310 | A1 * | 3/2005 | Tong et al. .................... | 707/7 |
| 2005/0131762 | A1 * | 6/2005 | Bharat et al. ................. | 705/14 |

(Continued)

OTHER PUBLICATIONS

Mei-Ling Shyu, Shu-Ching Chen, Min Chen, and Stuart H. Rubin, "Affinity-Based Similarity Measure for Web Document Clustering," the 2004 IEEE International Conference on Information Reuse and Integration (IRI'2004), pp. 247-252, Nov. 8-10, 2004, Las Vegas, Nevada, USA.*

(Continued)

*Primary Examiner*—Neveen Abel Jalil
*Assistant Examiner*—Tarek Chbouki
(74) *Attorney, Agent, or Firm*—Perkins Coie LLP

(57) ABSTRACT

A method and system for adapting search results of a query to the information needs of the user submitting the query is provided. A search system analyzes click-through triplets indicating that a user submitted a query and that the user selected a document from the results of the query. To overcome the large size and sparseness of the click-through data, the search system when presented with an input triplet comprising a user, a query, and a document determines a probability that the user will find the input document important by smoothing the click-through triplets. The search system then orders documents of the result based on the probability of their importance to the input user.

5 Claims, 7 Drawing Sheets

U.S. PATENT DOCUMENTS

| | | | |
|---|---|---|---|
| 2005/0144067 A1* | 6/2005 | Farahat et al. | 705/14 |
| 2005/0144158 A1* | 6/2005 | Capper et al. | 707/3 |
| 2006/0106709 A1* | 5/2006 | Chickering et al. | 705/37 |
| 2006/0190354 A1* | 8/2006 | Meisel et al. | 705/26 |
| 2006/0212350 A1* | 9/2006 | Ellis et al. | 705/14 |
| 2006/0212897 A1* | 9/2006 | Li et al. | 725/32 |
| 2006/0218115 A1* | 9/2006 | Goodman et al. | 707/1 |
| 2006/0224496 A1* | 10/2006 | Sandholm et al. | 705/37 |
| 2006/0248073 A1* | 11/2006 | Jones et al. | 707/5 |
| 2006/0287993 A1* | 12/2006 | Yao et al. | 707/4 |
| 2007/0005568 A1* | 1/2007 | Angelo et al. | 707/3 |
| 2007/0053513 A1* | 3/2007 | Hoffberg | 380/201 |
| 2007/0088693 A1* | 4/2007 | Lawrence | 707/5 |
| 2007/0112764 A1* | 5/2007 | Yih et al. | 707/5 |
| 2007/0156677 A1* | 7/2007 | Szabo | 707/5 |
| 2007/0260508 A1* | 11/2007 | Barry et al. | 705/14 |
| 2007/0289784 A1* | 12/2007 | Lapstun et al. | 178/18.03 |
| 2008/0040329 A1* | 2/2008 | Cussen et al. | 707/3 |
| 2008/0097834 A1* | 4/2008 | McElfresh et al. | 705/10 |
| 2009/0030864 A1* | 1/2009 | Pednault et al. | 706/45 |

OTHER PUBLICATIONS

Eren Manavoglu, Dmitry Pavlov and C Lee Giles, "Probabilistic User Behavior Models" Conference on Data Mining 2003.*

"Optimizing Search Engines using Clickthreough Data" author: Thorsten Joachims, dated 2002, pp. 1-10.*

"TowardThePrincipledUtilizationofContextualEvidenceWithinThe InformationRetrievalProcessInvestigatingtheTheoreticalFoundation ofLanguageModelBasedInformationRetrieval", dated Nov. 7, 2003.*

"UsingDocumentClusteringandLanguageModellinginMediatedInfo rmationRetrieval", Dated Aug. 28, 2002.*

"PrototypeToolsForResourceSelection", Dated Oct. 29, 2002.*

Charu C. Aggarwal, Joel L. Wolf, Kun-Lung Wu and Philip S. Yu, "Horting Hatches an Egg: a New Graph-Theoretic Approach to Collaborative Filtering," Knowledge Discovery and Data Mining, 1999.

Tomonari Kamba and Krishna Bharat, "An interactive, personalized, newspaper on the WWW," World Wide Web Conference, 1995.

Krishna Bharat, Tomonari Kamba and Michael Albers, "Personalized, Interactive News on the Web," May 5, 1997.

Peter F. Brown, Peter V. deSouza, Robert L. Mercer, Vincent J. Della Pietra and Jenifer C. Lai, "Class-Based n-gram Models of Natural Language," Computational Linguistics, vol. 18, No. 4, pp. 467-479, 1992.

John S. Breese, David Heckerman and Carl Kadie, "Empirical Analysis of Predictive Algorithms for Collaborative Filtering," Microsoft Technical Report MSR-TR-98-12, May 1998, revised Oct. 1998.

Huan Chang, David Cohn and Andrew K. McCallum, "Learning to Create Customized Authority Lists," International Conference on Machine Learning, 2000.

Chien Chin Chen, Meng Chang Chen and Yeali Sun, "PVA: A Self-Adaptive Personal View Agent System," KDD 2001, pp. 257-262.

Stanley F. Chen and Joshua Goodman, "An Empirical Study of Smoothing Techniques for Language Modeling," Computer Science Group, Harvard University Technical Report, TR-10-98, Aug. 1998.

Mark Claypool, Phong Le, Makoto Waseda and David Brown, "Implicit Interest Indicators," International Conference on Intelligent User Interfaces, 2001.

Mark O'Connor and Jon Herlocker, "Clustering Items for Collaborative Filtering," SIGIR Workshop 1999.

Taher H. Haveliwala, "Topic-Sensitive Page Rank," International World Wide Web Conference, ACM, 2002.

Ian H. Witten and Timothy C. Bell, "The Zero-Frequency Problem: Estimating the Probabilities of Novel Events in Adaptive Text Compression," IEEE Transactions on Information Theory, vol. 37, No. 4, Jul. 1991, pp. 1085-1094.

Thomas Hofmann, "Probabilistic Latent Semantic Analysis," 15th Conference on Uncertainty in Artificial Intelligence, 1999.

Thomas Hofmann and Jan Puzicha, "Latent Class Models for Collaborative Filtering," 16th International Joint Conference on Artificial Intelligence, 1999.

Glen Jeh and Jennifer Widom, "Scaling Personalized Web Search," 12th International World Wide Web Conference, 2003, pp. 271-279.

Thorsten Joachims, "Optimizing Search Engines using Clickthrough Data," 8th ACM SIGKDD International Conference on Knowledge Discovery and Data Mining, 2002.

Larry Kerschberg, Wooju Kim and Anthony Scime, "WebSifter II: A Personalizable Meta-Search Agent based on Semantic Weighted Taxonomy Tree," International Conference on Internet Computing, 2001, pp. 1-5.

Henry Lieberman, "Letizia: An Agent That Assists Web Browsing," International Joint Conference on Artificial Intelligence, 1995.

Fang Liu, Clement Yu and Weiyi Meng, "Personalized Web Search by Mapping User Queries to Categories," International Conference on Information and Knowledge Management, 2002.

Udi Manber, Ash Patel and John Robison, "Experience with Personalization on Yahoo!" Communications of the ACM, Aug. 2000, vol. 43, No. 8, pp. 35-39.

Dunja Mladenic, "Personal WebWatcher: design and implementation," Technical Report ijs-dp-7472, School of Computer Science, Carnegie-Mellon University, Pittsburgh, 1996.

Michael Pazzani, Jack Muramatsu & Daniel Billsus, "Syskill & Webert: Identifying interesting web sites," 13th National Conference on Artificial Intelligence, 1996.

Wade Roush, "Search Beyond Google," MIT Technology Review, Mar. 2004, 10 pages.

Teoma Search: About Teoma, "Adding a New Dimension to Search: The Teoma Difference is Authority" Copyright 2005 Ask Jeeves, Inc. (3 pages) http://sp.teoma.com/docs/teoma/about/searchwithauthority.html.

Cyrus Shahabi and Yi-Shin Chen, "Web Information Personalization: Challenges and Approaches," Databases in Networked Information Systems, 2003.

Hermann Ney, Ute Essen and Reinhard Kneser, "On structuring probabilistic dependences in stochastic language modeling," Computer Speech and Language, 8(1), 1994, pp. 1-38.

Upendra Shardanand and Pattie Maes, "Social Information Filtering: Algorithms for Automating 'Word of Mouth'," Computer Human Interaction Conference, 1995.

Ramakrishnan Srikant and Rakesh Agrawal, "Mining Generalized Association Rules," Proceedings of the 21st Very Large Data Bases Conference, 1995.

Kazunari Sugiyama, Kenji Hatano and Masatoshi Yoshikawa, "Adaptive Web Search Based on User Profile Constructed without Any Effort from Users," 13 International World Wide Web Conference, 2004, pp. 675-684.

Jidong Wang, Huajun Zeng, Zheng Chen, Hongjun Lu, Li Tao, and Wei-Ying Ma, "ReCoM: Reinforcement Clustering of Multi-Type Interrelated Data Objects," 26th International ACM SIGIR Conference 2003.

Gui-Rong Xue, Hua-Jun Zeng, Zheng Chen, Yong Yu, Wei-Ying Ma, Wensi Xi and Weiguo Fan, "Optimizing Web Search Using Web Click-through Data," Thirteenth ACM Conference on Information and Knowledge Management, 2004, pp. 118-126.

Gui-Rong Xue, Dou Shen, Qiang Yang, Hua-Jun Zeng, Zheng Chen, Wensi Xi, Yong Yu and Wei-Ying Ma, "IRC: An Iterative Reinforcement Categorization Algorithm for Interrelated Web Objects," IEEE International Conference on Data Mining, 2004.

S.E. Robertson, "Overview of the Okapi Projects," Journal of Documentation, vol. 53, No. 1, Jan. 1997 (pp. 3-7).

"The PageRank Citation Ranking: Bringing Order to the Web," Jan. 29, 1998.

Slava M. Katz, "Estimation of Probabilities from Sparse Data for the Language Model Component of a Speech Recognizer," IEEE Transaction on Acoustics, Speech, and Signal Processing, vol. ASSP-35, No. 3, Mar. 1987, 5 pages.

F. Jelinek, "Self-Organized Language Modeling for Speech Recognition," Language Processing for Speech Recognition, Morgan Kaufmann Publishers, San Mateo, California, 1990, pp. 450-506.

* cited by examiner

METHOD AND SYSTEM FOR ADAPTING SEARCH RESULTS TO PERSONAL INFORMATION NEEDS

TECHNICAL FIELD

The described technology relates generally to the importance of documents such as web pages to a user who submitted a query resulting in the documents.

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match, web page importance or popularity (e.g., Google's PageRank), and so on. The search engine service then displays to the user links to those web pages in an order that is based on a ranking determined by their relevance.

Two well-known techniques for ranking web pages are PageRank and HITS ("Hyperlinked-Induced Topic Search"). PageRank is based on the principle that web pages will have links to (i.e., "outgoing links") important web pages. Thus, the importance of a web page is based on the number and importance of other web pages that link to that web page (i.e., "incoming links"). In a simple form, the links between web pages can be represented by matrix A, where $A_{ij}$ represents the number of outgoing links from web page i to web page j. The importance score $w_j$ for web page j can be represented by the following equation:

$$w_j = \Sigma_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." Hub is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the result as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \rightarrow p} h(q) \text{ and } h(p) = \sum_{p \rightarrow q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j, \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j.

These web page ranking techniques base their rankings primarily on attributes of the web pages themselves. These web page ranking techniques, however, do not take into consideration the attributes of the user submitting the query. For example, an attorney who submits the query "L.A. court time" would get the same results as an athlete who submits the same query. In such a case, the attorney may be interested in web pages related to superior court times in Los Angeles County, whereas the athlete may be interested in web pages related to racquetball court times of the Los Angeles Parks and Recreation Department.

Personalized web search techniques have been developed to adapt search results to the individual user interests. A personalized web search technique attempts to provide a distinct search engine for each user by constructing a personal profile manually or automatically. The technique adapts the search results to the user who submitted the query based on their personal profile. A disadvantage of this technique, however, is that it is difficult to construct accurate personal profiles. Manual collection is difficult because most users are reluctant to provide their personal information manually, and automatic collection is difficult because it requires a large amount of user history data. Moreover, it is not clear whether complex user behavior can be accurately modeled by a personal profile.

It would be desirable to have a technique that would allow search results to be adapted to the user who submitted the query without having to rely on a personal profile of the user.

SUMMARY

A method and system for adapting search results of a query to the information needs of the user submitting the query is provided. A collaborative web search system analyzes click-through data to generate user, query, and document triplets ("click-through triplets") indicating that the user submitted the query and that the user selected the document from the results of the query. To overcome the large size and sparseness of the click-through data, the collaborative web search system when presented with a user, query, and document of the query result determines a probability that the user will find the document important by smoothing the click-through triplets. When the search system receives the result of a query, the search system calculates the probability for each document based on the click-through triplets and the smoothing techniques. The search system then orders the documents of the result based on the probability of their importance to the user who submitted the query.

DETAILED DESCRIPTION

Figure 1:
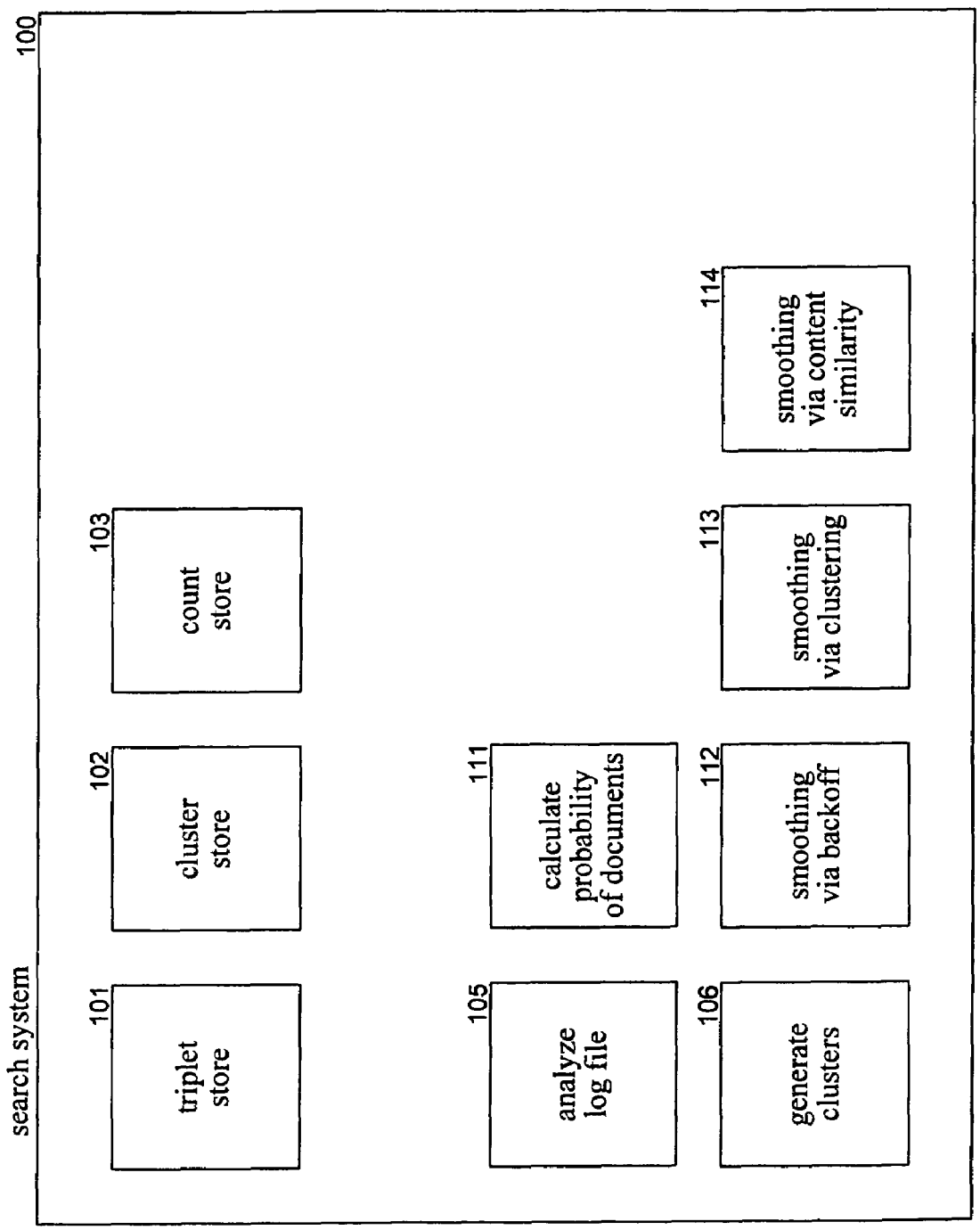
FIG. 1 is a block diagram illustrating components of a search system in one embodiment.

A method and system for adapting search results of a query to the information needs of the user submitting the query is provided. In one embodiment, a collaborative web search system analyzes click-through data to generate user, query, and document triplets ("click-through triplets") indicating that the user submitted the query and that the user selected the document from the results of the query. Most search engine services maintain server-side click-through data of the queries submitted by users, the query results, and the documents of the query results that the users selected. The click-through data, however, is typically both very large in size and very sparse. The click-through data is very large in the sense that a typical click-through log file may have millions of new entries added every day. The click-through data is very sparse in the sense that, of the millions of possible combinations of users, queries, and documents, triplets can only be generated for a relatively small number of these combinations from the click-through data. To overcome the size and sparseness of the click-through data, the collaborative web search system when presented with a user, query, and document combination determines a probability that the user that submitted that query will find that document of the result important by smoothing the click-through triplets. When the search system receives the result of a query, the search system calculates a probability for each document based on the click-through triplets and the smoothing techniques. The search system then orders the documents of the result based on the probability of their importance to the user who submitted the query.

The search system may use various smoothing techniques to account for the size and sparseness of the click-through triplets. In various embodiments, the search system uses various combinations of back-off, clustering, and content similarity smoothing techniques. The back-off smoothing technique ignores the distinctness of users when there is not enough data. In particular, when the click-through data contains a specific user, query, and document triplet of the query, referred to as an "input triplet," the back-off smoothing technique calculates the probability that the input user would select the input document based on the probability that users would select that document after submitting the input query as indicated by the click-through triplets. Because this probability is an approximation, the back-off smoothing technique adjusts the probability by a back-off estimator that accounts for unseen data.

The clustering smoothing technique identifies clusters of users, queries, and documents from the click-through triplets. In particular, the clustering smoothing technique identifies clusters of users based on queries and documents, clusters of queries based on users and documents, and clusters of documents based on users and queries as indicated by the click-through triplets. The clustering smoothing technique calculates the probability of a document for an input triplet based on the probability that a user in the user cluster of the input user who submits a query of the query cluster of the input query selects a document from the document cluster of the input document, the user cluster, and the query cluster. The search system may combine the back-off smoothing technique and the clustering smoothing technique to generate an overall probability for the input document.

The content similarity smoothing technique uses content features of the documents and queries to identify the cluster (as described above) to which an input query or an input document belongs when the input query or the input document is not in a click-through triplet. In particular, the content similarity smoothing technique represents each cluster with a content feature vector derived from the objects (i.e., queries or documents) within the cluster. The content similarity smoothing technique identifies the query cluster to which the query is most similar or the document cluster to which the input document is most similar. The technique may calculate the similarity based on a content feature vector, such as a term frequency vector, that is derived from the words of the object. Once the clusters are identified for the input user, query, and document, the content similarity smoothing technique calculates the probability in a manner similar to that of the clustering smoothing technique. The search system may combine the back-off smoothing technique and the content similarity smoothing technique to generate an overall probability for the input document.

In one embodiment, the back-off smoothing technique approximates the probability of an input document as the probability of the document being selected by any user who submits the input query. The back-off smoothing technique represents the probability of the input document by the following equation:

$$P(d|u,q) = \alpha P(d|q) \quad (1)$$

where $P(d|u,q)$ is the probability of the input document given the input user and the input query, $P(d|q)$ is the probability of the input document given the input query, and $\alpha$ is a back-off factor. The back-off factor is between 0 and 1 and represents a smoothing of the approximation of the formal definition of $P(d|u,q)$, which is represented by the following equation:

$$P(d|u,q) = \frac{C(d,u,q)}{C(u,q)} \quad (2)$$

where $C(d,u,q)$ is the number of click-through triplets with user u, query q, and document d and $C(u,q)$ is the number of click-through triplets with user u and query q. The approximated probability of Equation 1 can be smoothed by various linear interpolation smoothing techniques such as a back-off factor. The back-off smoothing technique represents the probability by the following equation:

$$P_B(d|u,q) = \begin{cases} \hat{P}(d|u,q) & \\ \text{if } C(u,q,d) > 0 & \\ \beta(u,q) \times p(d|q) & \\ \text{if } C(u,q,d) = 0 \text{ and } C(u,q) > 0 & \end{cases} \quad (3)$$

where $P_B$ is the probability based on the back-off smoothing technique, the discounted probability is represented by the following equation:

$$\hat{P}(d|u,q) = \frac{\text{discount } C(u,q,d)}{C(u,q)} \quad (4)$$

and $\beta(u,q)$ is a normalization constant represented by the following equation:

$$\beta(u,q) = \frac{1 - \sum_{d:C(u,q,d)>0} \hat{P}(d|u,q)}{1 - \sum_{d:C(u,q,d)>0} \hat{P}(d|q)} \quad (5)$$

The technique first determines whether the input triplet is represented in the click-through data. If so, it applies a discount function to the number of click-through triplets that match the input triplet divided by the number of click-through triplets with the input user and input query to calculate the probability. Otherwise, the technique applies a normalization constant to the probability of the input document given the input query to calculate the probability. The technique may use various smoothing techniques to generate the discount function such as linear smoothing, absolute smoothing, Good-Turing smoothing, Witten-Bell smoothing, and so on.

In some embodiments, the search system calculates the importance of an input document based on clusters of users, queries, and documents generated from the click-through triplets. The search system clusters the users with similar interests together based on submitting similar sets of queries and selecting similar sets of documents. Objects in the same click-through triplets are related, and the clusters represent that relationship. The search system represents an object of one object type by a feature vector comprising the objects of the other two object types that are in the same click-through triplet. For example, the feature vector for a certain document is the list of users (weighted by frequency) that selected that document and the list of queries (weighted by frequency) that included the document in its result. The search system represents the feature vector of a user by the following equation:

$$F_u = \{Q_u, D_u\} \quad (6)$$

where $F_u$ is the feature vector of user u, $Q_u$ represents the queries submitted by user u, and $D_q$ represents the documents selected by user u. The technique represents the feature vector of a query by the following equation:

$$F_q = \{U_q, D_q\} \quad (7)$$

where $F_q$ is the feature vector of query q, $U_q$ represents the users who submitted query q, and $D_q$ represents the documents selected from the results of query q. The technique represents the feature vector of a document by the following equation:

$$F_d = \{U_d, Q_d\} \quad (8)$$

where $F_d$ is the feature vector of document d, $U_d$ represents the users who selected document d, and $Q_d$ represents the queries from whose results document d was selected.

The search system may use various techniques to generate the clusters for the users, queries, and documents using these relationship feature vectors. In one embodiment, the search system uses a K-means algorithm. The search system provides to the algorithm a number K that specifies the desired number of clusters. In the first pass, the algorithm takes the first K objects (i.e., users, queries, or documents) as the centroid of a unique cluster. The algorithm then assigns each of the remaining objects to the cluster with the closest centroid to the feature vector of the object. In the subsequent passes, the algorithm recomputes the cluster centroids based the previous pass and then reassigns each object to the cluster with the centroid that is closest to its feature vector. The algorithm may be performed for a fixed number of passes (e.g., three) or until the clustering converges on a solution.

In one embodiment, a clustering smoothing technique calculates importance of an input document based on these clusters using the following equation:

$$P_R(d|u,q) = P(d|C_d) \times P(C_d|C_u, C_q) \quad (9)$$

where $P_R(d|u,q)$ is the probability of document d being selected given user u and query q, $C_u$ is the cluster that contains user u, $C_q$ is the cluster that contains query q, $C_d$ is the cluster that contains document d, $P(d|C_d)$ is the probability that cluster $C_d$ contains document d, and $P(C_d|C_u, C_q)$ is the probability that cluster $C_d$ contains a document selected by a user in cluster $C_u$ who submitted a query in cluster $C_q$. The technique represents the probability that cluster $C_d$ contains document d by the following equation:

$$P(d|C_d) = \frac{C(d)}{C(C_d)} \quad (10)$$

where $P(d|C_d)$ is the probability that cluster $C_d$ contains document d, C(d) is the number of click-through triplets that include document d, and $C(C_d)$ is the number of click-through triplets that have their document in cluster $C_d$. The technique represents the probability that cluster $C_d$ contains a document selected by a user in cluster $C_u$ who submitted a query in cluster $C_q$ by the following equation:

$$P(C_d | C_u, C_q) = \frac{C(C_u, C_q, C_d)}{C(C_u, C_q)} \quad (11)$$

where $P(C_d|C_u,C_q)$ is the probability that cluster $C_d$ contains a document selected by a user in cluster $C_u$ who submitted a query in cluster $C_q$, where $C(C_u,C_q,C_d)$ is the number of click-through triplets that have their user in cluster $C_u$, their query in cluster $C_q$, and their document in cluster $C_d$, and $C(C_u,C_q)$ is the number of click-through triplets that have their user in cluster $C_u$ and their query in cluster $C_q$. The technique may generate the overall probability by combining the probability of the back-off smoothing technique and the clustering smoothing technique as represented by the following equation:

$$P(d|u,q) = \lambda P_B(d|u,q) + (1-\lambda)P_R(d|u,q) \quad (12)$$

where P is the overall probability and $\lambda$ is a weighting factor.

In one embodiment, a content similarity smoothing technique is used to account for queries and documents that are not represented in the click-through triplets. When a new query or a new document is encountered, the clustering smoothing technique cannot be used because the count of click-through triplets for the new query or the new document is zero. In such a case, the search system uses the content similarity smoothing technique to identify the object cluster that is closest to the new object and assigns the new object to that cluster. The technique bases the similarity of an object to a cluster based on the content of the object (i.e., words of the query or the document). The technique represents each object by a content feature vector derived from the words of the object (e.g., term frequency vector). The technique represents each cluster by a content feature vector derived from the objects within the cluster (e.g., the centroid of the content feature vectors of the objects within the cluster). The technique represents the set of query clusters as the following equation:

$$C_q = \{C_q^1, C_q^2, \ldots, C_q^m\}$$

where $C_q^i$ is the ith query cluster. The technique represents the set of document clusters by the following equation:

$$C_d = \{C_d^1, C_d^2, \ldots, C_d^n\}$$

where $C_d^i$ is the ith document cluster. The technique represents the content feature vector for a query cluster as $F_{C_q^i}$ where F is the centroid of the content feature vectors of query cluster i and for a document cluster as $F_{C_d^i}$ where F is the centroid of the content feature vectors of the document cluster i. The technique represents query similarity by the following equation:

$$C_q = \arg\max_{C_q^i} \cos(F_q, F_{C_q^i}) \quad (13)$$

and represents document similarity by the following equation:

$$C_d = \arg\max_{C_d^i} \cos(F_d, F_{C_d^i}) \quad (14)$$

One skilled in the art will appreciate that similarity can alternatively be calculated using various well-known methods. The technique assigns the object to the most similar cluster. The technique then calculates the probability of the document using the following equation:

$$P_C(d|u,q) = P(d|C_d) \times P(C_d|C_u,C_q) \quad (15)$$

where $P_C$ is the probability based on content similarity.

In one embodiment, the search system combines the smoothing techniques as represented by the following equation:

$$P(d|u,q) = \begin{cases} \lambda P_B(d|u,q) + (1-\lambda)P_R(d|u,q) & (16) \\ \text{if } q \text{ and } d \text{ are seen data} \\ \lambda P_B(d|u,q) + (1-\lambda)P_C(d|u,q) \\ \text{if } q \text{ or } d \text{ is unseen data} \end{cases}$$

where $\lambda$ is a weighting factor. The search system may also be combined with other document ranking systems. For example, the back-off smoothing technique may factor in the importance of a document as calculated by the PageRank technique when assigning a probability. That is, the probability as calculated by the back-off smoothing technique can be increased for documents with high importance and decreased for documents with low importance.

FIG. 1 is a block diagram illustrating components of a search system in one embodiment. The search system includes a triplet store 101, a cluster store 102, and a count store 103. An analyze log file component 105 analyzes click-through data in a log file to generate the triplet store, cluster store, and count store. Various well-known techniques may be used by the analyze log file component to identify the triplets from the click-through data of the log file. Alternatively, the search system may be provided with user, query, and document triplets generated by means other than analyzing click-through data. The component invokes a generate clusters component 106 to identify clusters of users, queries, and documents from the click-through triplets. The component stores the cluster information in the cluster store. The component also calculates various counts from the click-through triplets and stores those counts in the count store. A calculate probability of documents component 111 is passed an input user, input query, and input documents resulting from the input query. The calculate probability of documents component invokes a smoothing via back-off component 112, a smoothing via clustering component 113, and a smoothing via content similarity component 114 to calculate the probability that the input user will select each input document. The search system may then present the input documents to the input user ranked in order based on the calculated probabilities.

The computing device on which the search system is implemented may include a central processing unit, memory, input devices (e.g., keyboard and pointing devices), output devices (e.g., display devices), and storage devices (e.g., disk drives). The memory and storage devices are computer-readable media that may contain instructions that implement the search system. In addition, the data structures and message structures may be stored or transmitted via a data transmission medium, such as a signal on a communications link. Various communications links may be used, such as the Internet, a local area network, a wide area network, or a point-to-point dial-up connection.

The search system may be implemented in various operating environments. The operating environment described herein is only one example of a suitable operating environment and is not intended to suggest any limitation as to the scope of use or functionality of the search system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The search system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
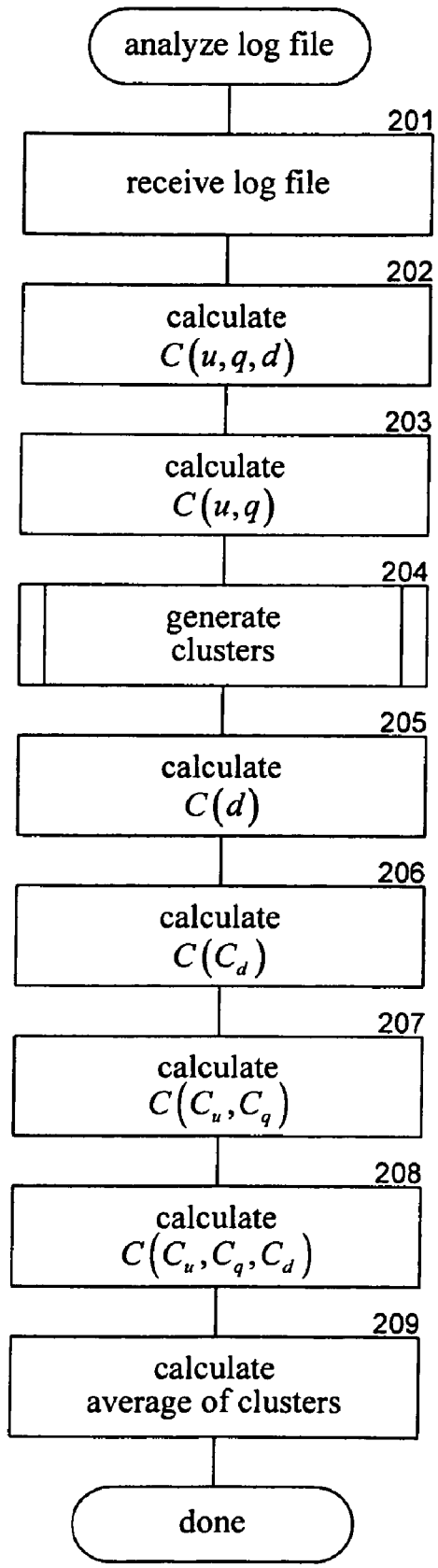
FIG. 2 is a flow diagram that illustrates the processing of the analyze log file component of the search system in one embodiment.

FIG. 2 is a flow diagram that illustrates the processing of the analyze log file component of the search system in one embodiment. In block 201, the component receives the log file of click-through data and identifies the click-through triplets. In block 202, the component counts the number of triplets for each unique combination of user, query, and document and stores those numbers in the count store. In block 203, the component counts the number of triplets for each unique combination of a user query and stores those numbers in the count store. In block 204, the component invokes the generate clusters component to generate the user, query, and document clusters. In block 205, the component counts the number of times each document occurs in a triplet and stores those numbers in the count store. In block 206, the component counts the number of click-through triplets in each document cluster and stores the numbers in the count store. In block 207, the component counts the number of click-through triplets within each pair of user cluster and query cluster and stores the numbers in the count store. In block 208, the component counts the number of click-through triplets within each unique combination of user cluster, query cluster, and document cluster and stores the numbers in the count store. In block 209, the component calculates the average feature vector of each query cluster and each document cluster and stores the averages in the count store. The component then completes.

Figure 3:
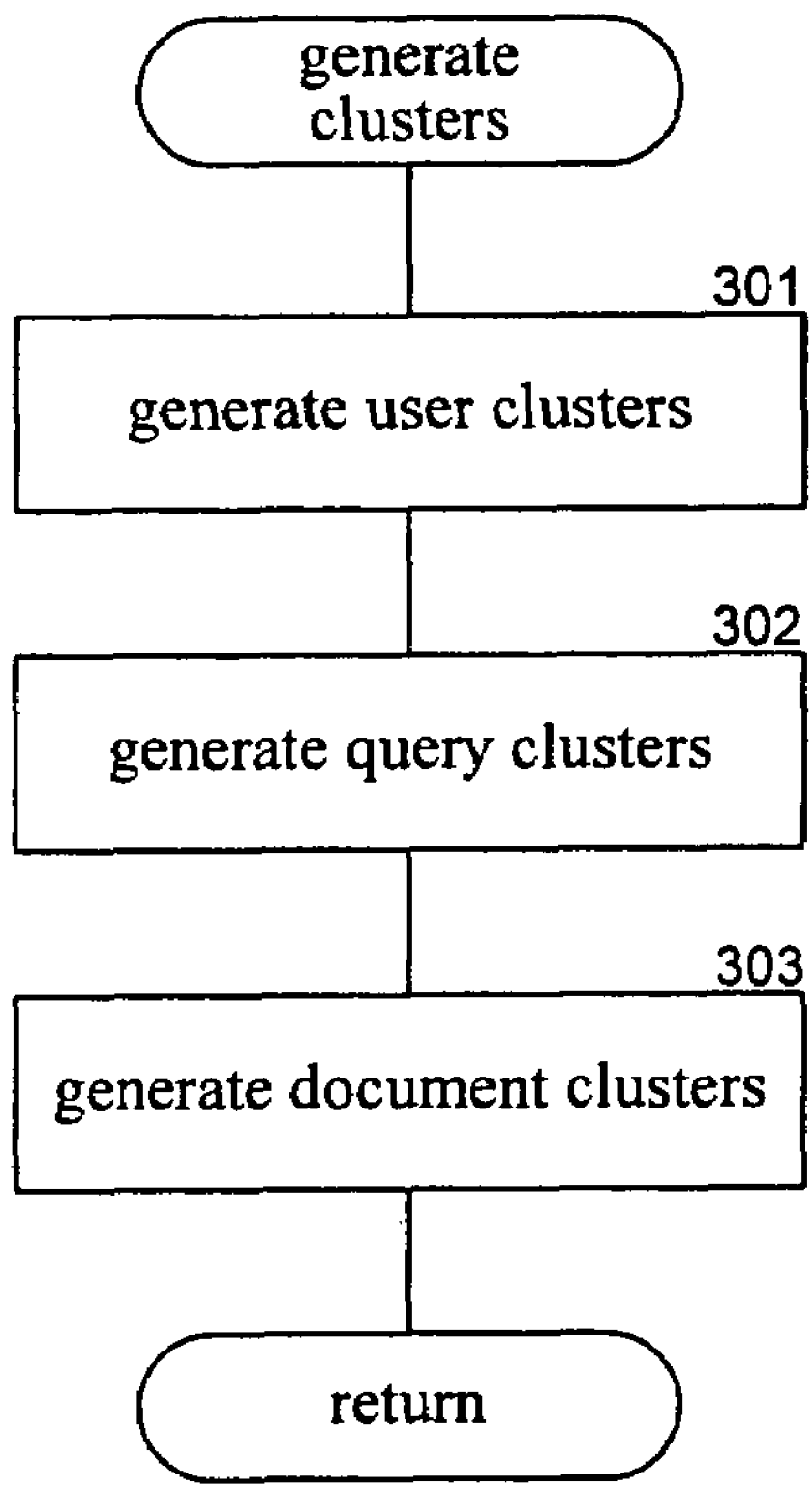
FIG. 3 is a flow diagram that illustrates the processing of the generate clusters component of the search system in one embodiment.

FIG. 3 is a flow diagram that illustrates the processing of the generate clusters component of the search system in one embodiment. This component identifies user clusters, query clusters, and document clusters using a K-means clustering algorithm. One skilled in the art will appreciate that other clustering algorithms may be used. In block 301, the component generates the relationship feature vectors for the users and then identifies the user clusters. In block 302, the component generates the relationship feature vectors for the queries and then identifies the query clusters. In block 303, the component generates the relationship feature vectors for the documents and then identifies the document clusters. The component stores the identifications of the clusters in the cluster store. The component then returns.

Figure 4:
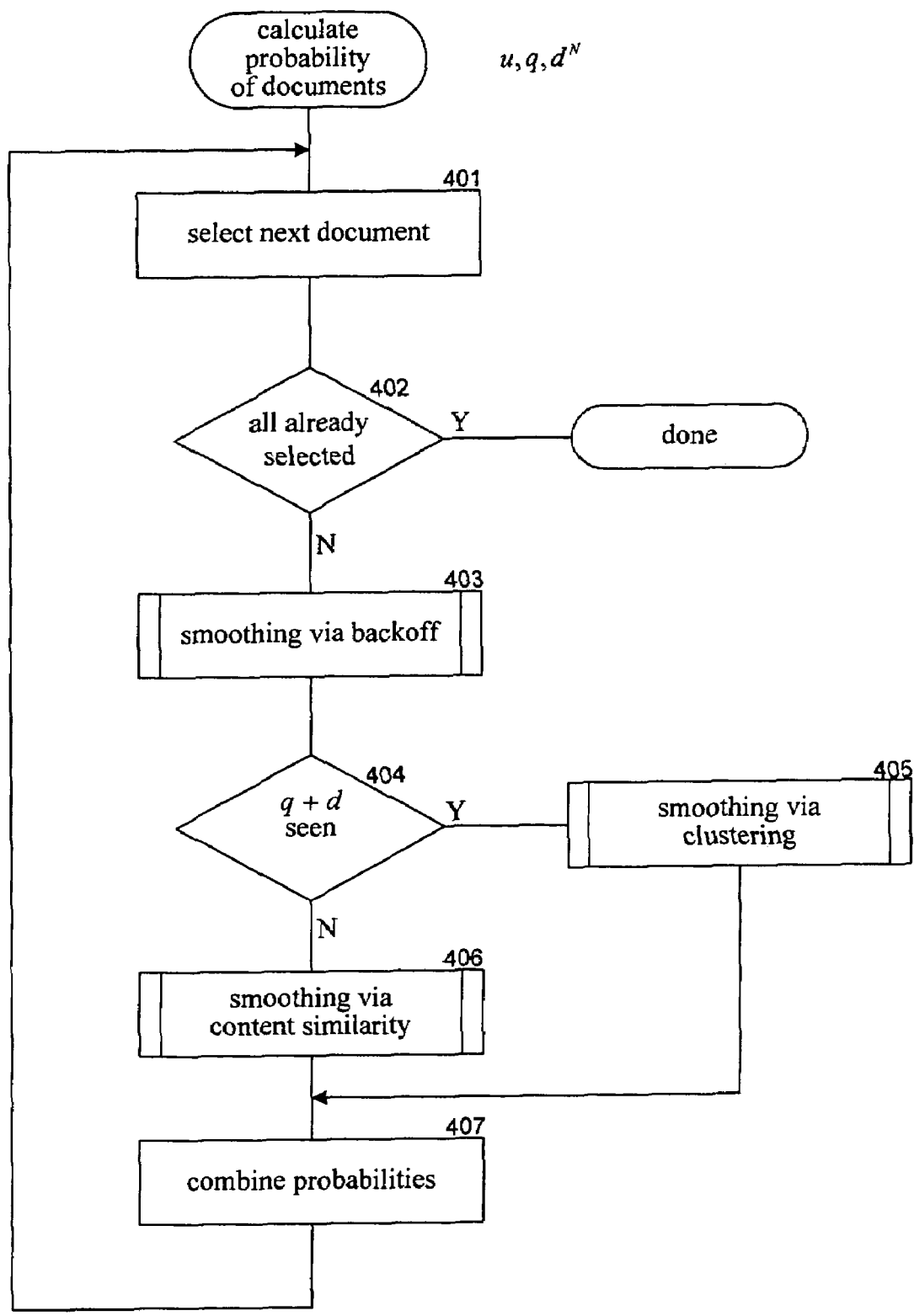
FIG. 4 is a flow diagram that illustrates the processing of the calculate probability of documents component of the search system in one embodiment.

FIG. 4 is a flow diagram that illustrates the processing of the calculate probability of documents component of the search system in one embodiment. The component is passed an input user, an input query, and input documents resulting from the input query. The component loops calculating a probability for each document. In block 401, the component selects the next document. In decision block 402, if all the documents have already been selected, then the component completes, else the component continues at block 403. In block 403, the component invokes the smoothing via back-off component to calculate the back-off probability. In decision block 404, if the input query and the selected document have been seen before (i.e., are in a click-through triplet), then the component continues at block 405, else the component continues at block 406. In block 405, the component invokes the smoothing via clustering component to calculate the clustering probability for the selected document. In block 406, the component invokes the smoothing via content similarity component to calculate the content similarity probability for the selected document. In block 407, the component combines the probabilities to generate an overall probability for the document using Equation 16 and then loops to block 401 to select the next document.

Figure 5:
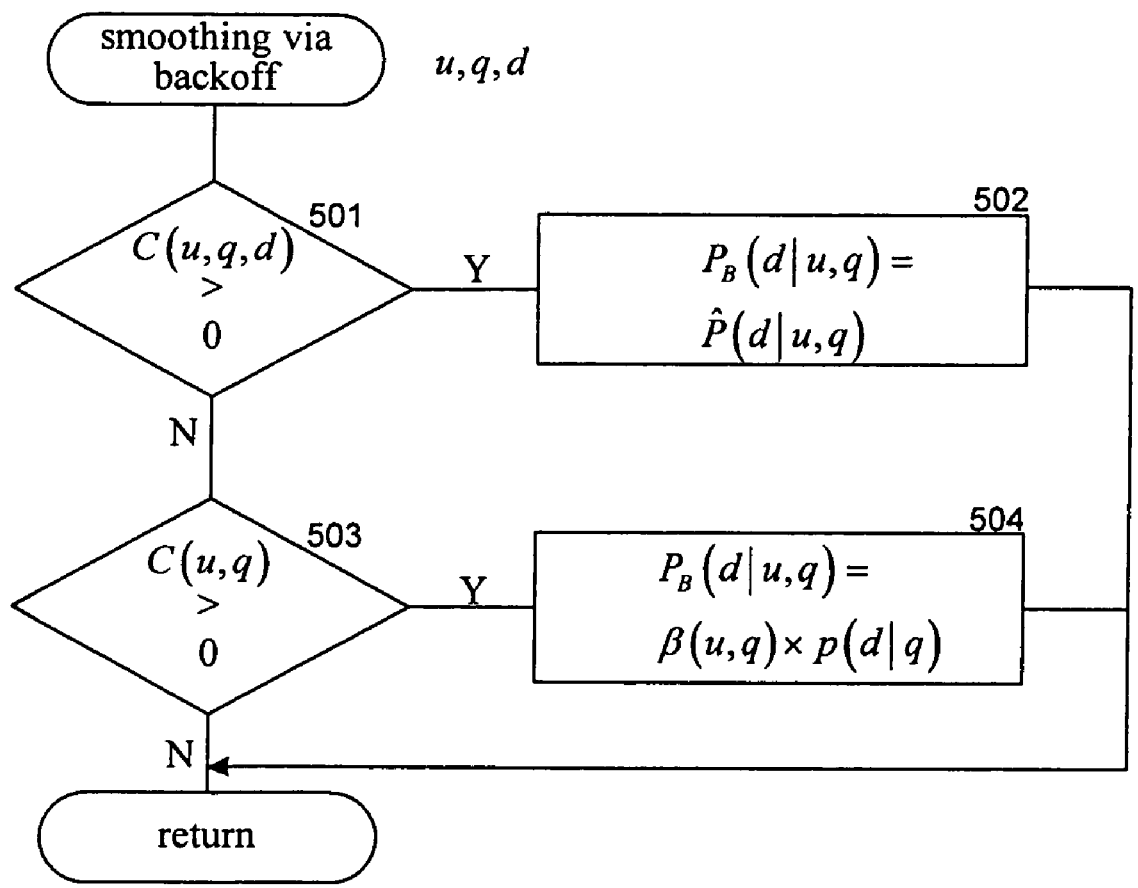
FIG. 5 is a flow diagram that illustrates the processing of the smoothing via back-off component of the search system in one embodiment.

FIG. 5 is a flow diagram that illustrates the processing of the smoothing via back-off component of the search system in one embodiment. The component is passed an input triplet and calculates the back-off probability for the input document. In decision block 501, if the input triplet is a click-through triplet, then the component continues at block 502, else the component continues at block 503. In block 502, the component calculates the probability of the input document using Equation 4 and then returns. In decision block 503, if a click-through triplet contains the input user and the input query, then the component continues at block 504, else the component returns without calculating a probability. In block 504, the component calculates the probability of the input document using Equation 5 and then returns.

Figure 6:
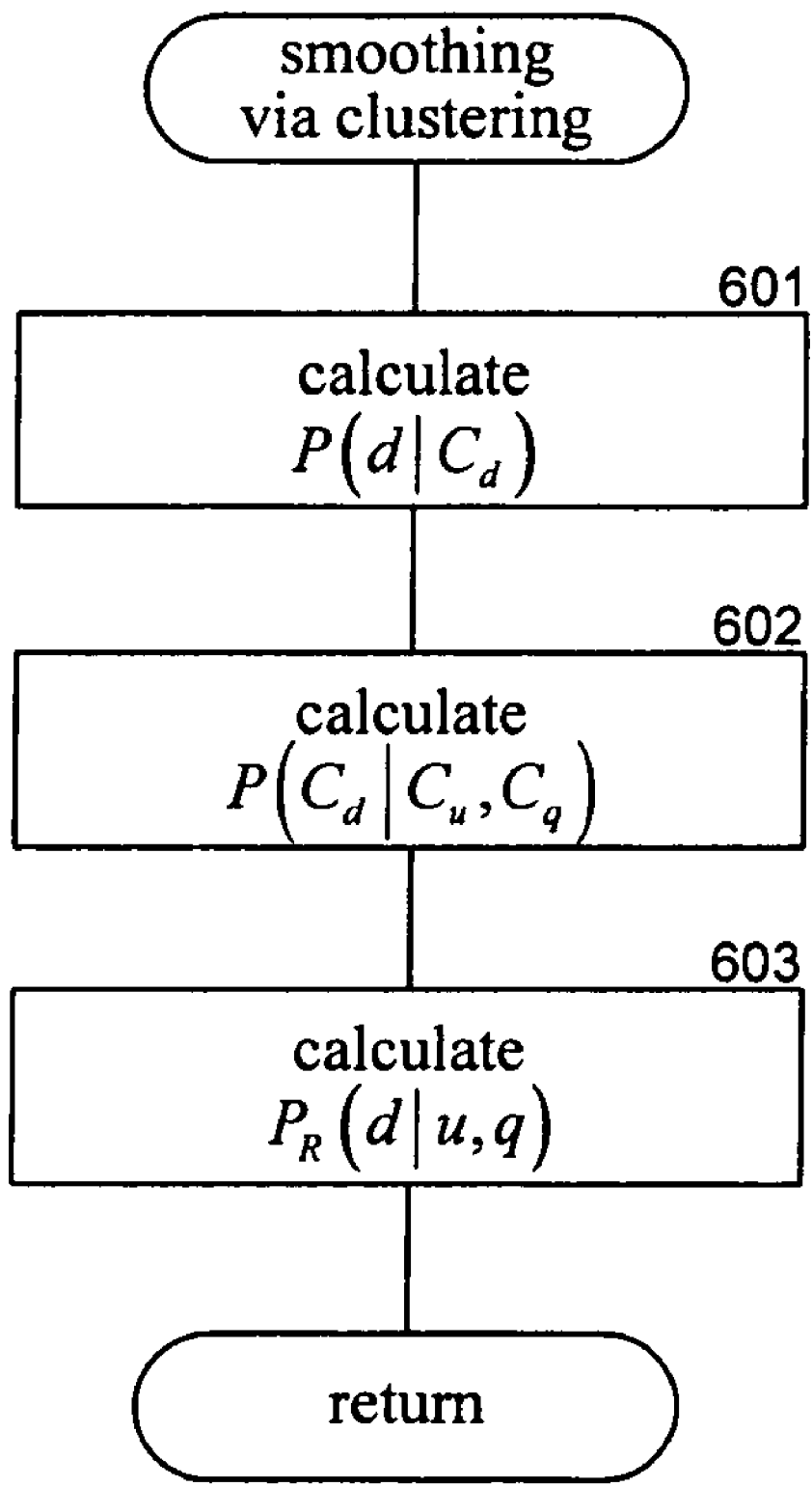
FIG. 6 is a flow diagram that illustrates the processing of the smoothing via clustering component of the search system in one embodiment.

FIG. 6 is a flow diagram that illustrates the processing of the smoothing via clustering component of the search system in one embodiment. The component is passed an input triplet in which the input user, input query, and input document are in a click-through triplet. In block 601, the component calculates a probability using Equation 10. In block 602, the component calculates a probability using Equation 11. In block 603, the component combines the calculated probabilities using Equation 9 and then returns.

Figure 7:
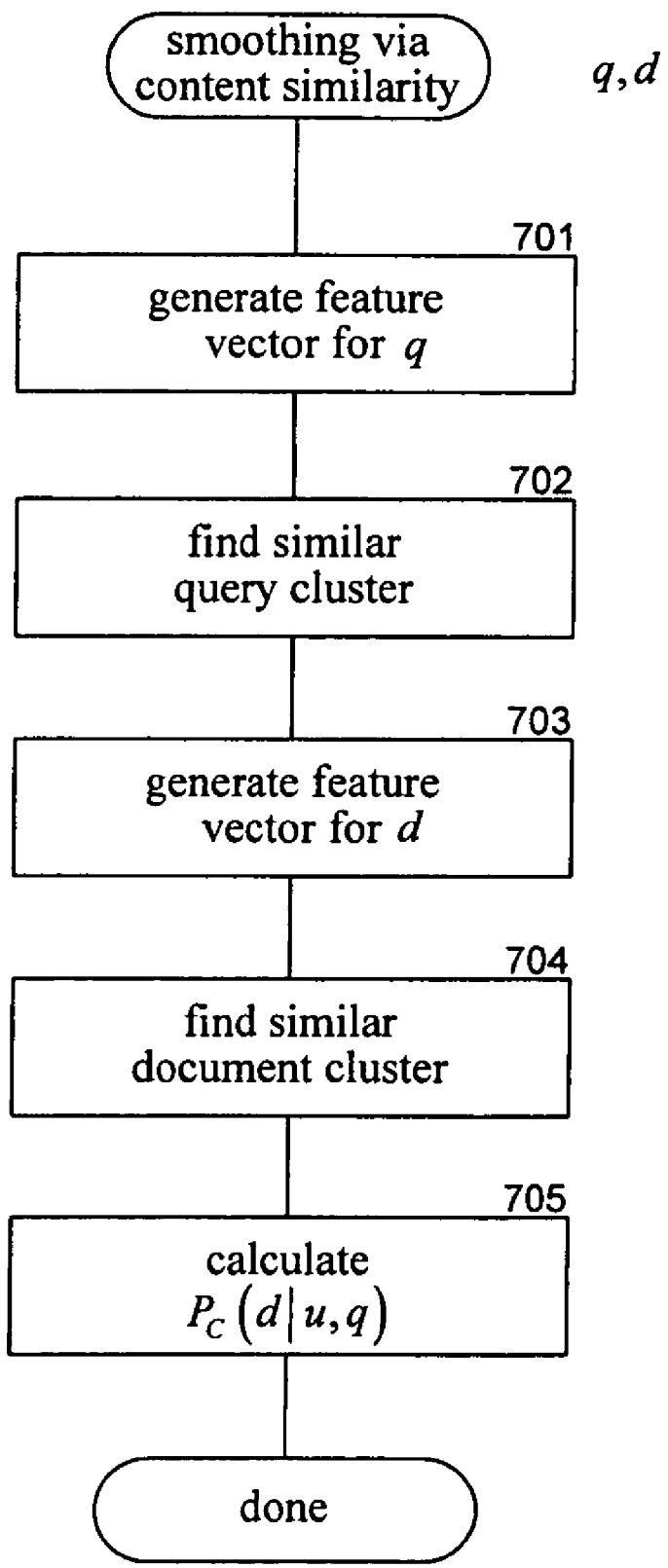
FIG. 7 is a flow diagram that illustrates the processing of the smoothing via content similarity component of the search system in one embodiment.

FIG. 7 is a flow diagram that illustrates the processing of the smoothing via content similarity component of the search system in one embodiment. The component is passed an input within which the input query and/or the input document are not in a click-through triplet. In block 701, the component generates a content feature vector for the input query. In block 702, the component finds a similar query cluster calculating similarity using Equation 13. In block 703, the component generates a content feature vector for the input document. In block 704, the component finds a similar document cluster calculating similarity using Equation 14. In block 705, the component calculates the probability using Equation 15. The component then returns.

One skilled in the art will appreciate that although specific embodiments of the search system have been described herein for purposes of illustration, various modifications may be made without deviating from the spirit and scope of the invention. Accordingly, the invention is not limited except by the appended claims.

We claim:

1. A computer-readable storage medium containing instructions for controlling a computer system to calculate relevance of a document to a user, by a method comprising:
   providing click-through data generated when users submitted queries to a search engine and selected a document from results provided by the search engine;
   identifying user, query, and document triplets from the click-through data, each triplet indicating that the user of the triplet submitted the query of the triplet and the user selected the document of the triplet from results of the query provided by the search engine;
   identifying user clusters of users and query clusters of queries such that each user is in only one user cluster and each query is in only one query
   receiving from a user a query;
   searching for documents to be provided as results of the received query;
   for each document of the results of the received query, determining a probability that the user from whom the query was received will find the document relevant by performing a smoothing of the identified triplets to account for sparseness of the triplets and calculating the probability based on the smoothed triplets, the smoothing including:
     smoothing via backoff by:
       when the identified triplets include a triplet for the user, query, and document, setting a first probability based on a discounted count of the number of identified triplets for the user, query, and document and the number of triplets for the user and query; and
       when the identified triplets do not include a triplet for the user, query, and document, setting the first probability based on the number of identified triplets for the query and the document and the number of identified triplets for the document and based on a normalization constant;
     when the identified triplets include a triplet for the query and document, smoothing via clustering by setting a second probability based on a probability that a user in the user cluster that includes the user from whom the query was received selects the document from the query; and
     when the identified triplets do not include a triplet for the query and document, smoothing via content similarity by:
       identifying the query cluster to which the query is most similar; and
       setting the second probability based on a probability that a user selects the document from a query that is in the query cluster; and
     combining the first probability and the second probability into an overall probability of the document; and
   displaying an indication of the documents to the user from whom the query was received in an order based on the combined overall probabilities of the documents.

2. The computer-readable medium of claim 1, including processing the triplets to calculate various counts.

3. The computer-readable medium of claim 1, wherein the probability is the probability of the input document given the input user and input query when the user, query, and document are in an identified triplet and is the probability of the input document given the input query otherwise.

4. The computer-readable medium of claim 1 wherein the probability is based on similarity between the input document and document clusters identified based on relationships between users and queries.

5. A computing device with a processor and memory for calculating relevance of a document, comprising:
   a click-through data store;
   a component that identifies user, query, and document triplets from the click through data;
   a component that identifies user clusters of users and document clusters of documents such that each user is in only one user cluster and each document is in only one document cluster;
   a component that receives an input user, an input query, and input documents, the input documents representing results of the input query submitted by the input user; and
   for each input document, determining a probability that the input user will find the input document relevant by performing a smoothing by performing
     when the same input user, input query, and input document triplet was identified in the click-through data, a first backoff smoothing by setting a first probability that is a discounted probability of when the input user submits the input query, the input user selects the input document as indicated by the identified triplets;
     when only the same input user and input query were identified in a triplet of the click-through data, a second backoff smoothing by setting the first probability that is a normalized probability of when a user submits the input query, that user selects the input document as indicated by the identified triplets;
     when both the input query and input document were identified in a triplet of the click-through data, a clustering smoothing by setting a second probability based on a probability that a user in the user cluster that includes the input user selects the input document from the input query as indicated by the identified triplets; and
     when both the input query and input document were not identified in a triplet of the click-through data, a content similarity smoothing by:
       identifying a document cluster to which the input document is most similar; and
       setting the second probability based on a probability that a user selects a document of the document cluster from the input query as indicated by the identified triplets; and
     combining the first probability and the second into an overall probability of the input document to account for sparseness of the identified triplets.

* * * * *

UNITED STATES PATENT AND TRADEMARK OFFICE
CERTIFICATE OF CORRECTION

PATENT NO. : 7,630,976 B2  Page 1 of 1
APPLICATION NO. : 11/125839
DATED : December 8, 2009
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 469 days.

Signed and Sealed this

Second Day of November, 2010

David J. Kappos
*Director of the United States Patent and Trademark Office*